Sept. 2, 1969  E. SCHREIBER ET AL  3,464,257

DEVICE FOR DETERMINING THE SOOT CONTENT OF FLUE GASES

Filed Feb. 14, 1967

Inventors
Erich Schreiber
Othmar Skatsche
By
Watson, Cole, Grindle & Watson
Attys

United States Patent Office 3,464,257
Patented Sept. 2, 1969

3,464,257
DEVICE FOR DETERMINING THE SOOT CONTENT OF FLUE GASES
Erich Schreiber and Othmar Skatsche, Graz, Austria, assignors to Hans List, Graz, Austria
Filed Feb. 14, 1967, Ser. No. 615,963
Claims priority, application Austria, Apr. 14, 1966, A 3,554/66
Int. Cl. G01n 1/22, 15/06, 21/20
U.S. Cl. 73—28                3 Claims

ABSTRACT OF THE DISCLOSURE

A device for determining the soot content of flue gases, in which the system includes a sampling pipe branching off the pipe carrying the flue gas current with a filter tap and step-by-step switch gear. A photoelectric measuring instrument measures the degree of blackening at certain places of the filter tape as are traversed by the flue gases.

---

Figure 1:
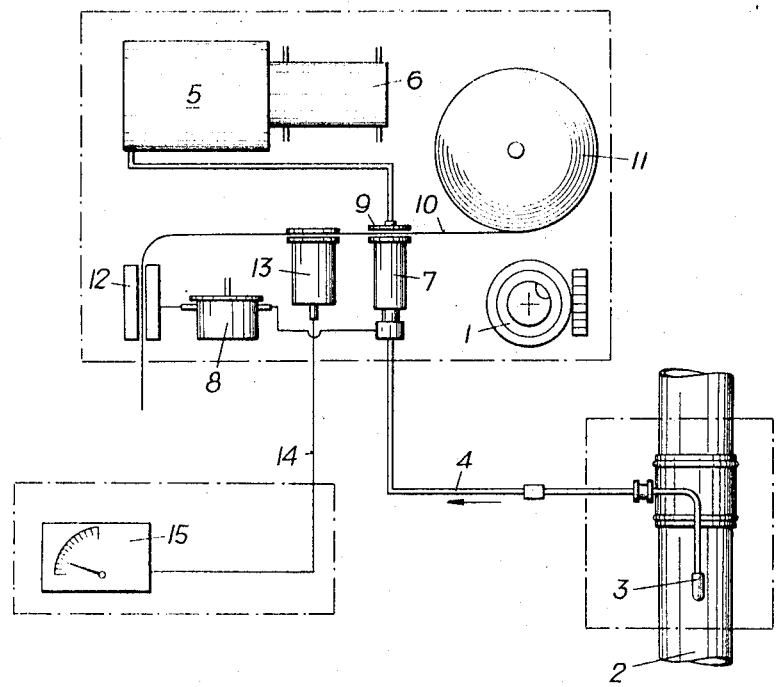

The invention relates to a device for determining the soot content of flue gases by the degree of blackening of a filter traversed by a predetermined amount of flue gases taken from the flue gas current via a simpling pipe.

In a conventional device of this kind the soot content is determined by means of a number of appropriately marked small filter paper plates. To perform the measurement, the operator has to move close to the engine to be tested for the purpose of taking the sample and then to effect the zero-white-level adjustment of the visual reading instrument by hand for the subsequent evaluation procedure. This method is, however, comparatively complicated and time-consuming, apart from the risk of confusing the blackened filter paper plates. Additional individual sources of error are inherent in the zero-white-level adjustment of the visual reading instrument by hand.

It is the object of the invention to eliminate individual influences in connection with the determination of the soot content of flue gases to a considerable extent in order to be able to successfully exploit the valuable clues on the combustion pattern of the tested machine provided by this method. The device according to the invention comprises a filter tape capable of performing a preferably rhythmic motion in transverse relation to the sampling pipe, the blackening of the said filter being measurable by means of an adjacent photoelectric measuring instrument. Such a device permits the continued surveillance of the soot content of the flue gases without interrupting the operation of the machine to be tested and the avoidance of delays due to the time required for the analysis of the test filters. It is both possible with this method to take samples at short intervals during the operation of the machine, evaluating the blackened filter tape in another place or at a later date, and to analyze every single sample by the immediate measurement of the relative light transmittance of the filter tape on the very test bench.

Continued recording of successive flue gas samples on the filter tape also ensures absolute correctness of the sequence of samples to be analyzed at a later date and precludes errors due to a mix-up of samples. Therefore, the exposed filter tapes may be conveniently filed away for later use such as for comparisons with subsequent serial measurements.

The device according to the invention may be either hand-operated or remote-controlled as required. In particular, it is also possible to evaluate recordings directly on the test bench. For the feed of the filter tape it may be preferable under certain circumstances to make provision for a continuous advance of the filter tape in addition to the rhythmic motion. With a continuous tape feed the result of the measurements provides an immediate clue on the tendency of the soot content during the test. In particular, the influence of various adjustments of the tested internal combustion engine upon the combustion process is thus distinctly revealed. On the other hand, where the filter tape advances in a rhythmic motion so that during each individual sampling operation the same accurately determined amount of flue gas is taken at always identical intervals of time, the analysis of the various samples provides an exact indication of the degree of blackening and consequently, of the soot content.

According to another feature of the invention as applied to a device wherein the filter tape advances in a rhythmic motion, the said filter tape moves in the area of the sampling pipe between a fixed sealing surface and a movable sealing surface extending in parallel relation to the former, of a press pad bearing down on the said filter tape during the feed pauses, thereby precluding leakage losses during the extraction of flue gas samples liable to vitiate the results of the measurements.

According to a preferred embodiment of the invention, the feed of the filter tape, the opening and closing of the press pad as well as the piston travel of a working cylinder connected to the sampling pipe and receiving a predetermined amount of flue gases are automatically controlled by means of a central control such as for example, by means of a pneumatic servo arrangement operated by means of a servomotor via sequence switch cams. This arrangement greatly simplifies the operation of the instrument and permits the use of unskilled operators since the automation of all of the essential control functions precludes individual sources of error. In particular, automatic control of the instrument ensures extreme precision for the removal of a predetermined amount of flue gases at the required intervals of time.

According to a further embodiment of the invention as applied to a device comprising an adjacent photoelectric measuring instrument and featuring a feeder system involving rhythmic motions of the filter tape, the rate of feed is such as to convey the blackened spot immediately in a single switch step to the photo-electric measuring instrument, so that each individual flue gas sample is analyzed immediately following its extraction from the flue gas current. Consequently, such corrective measures as have been found to be necessary as a result of the measurements can be taken immediately after the sampling operation by appropriate readjustment of the tested engine.

Finally, according to the invention the filter tape is provided with a perforation in which the feeder engages. Thus the travel of the filter tape in response to each switch step is held within close limits so as to make sure that the previously blackened spot on the filter tape will be located exactly in central relation to the optical axis of the photo-electric measuring instrument during the subsequent measurement of the degree of blackening. The filter tape is preferably reinforced in the area of the perforation in order to avoid elongation or fissuration. The progressive advance of the filter tape can be effected, for example, by means of a step-by-step switch generally used in cinematography, such as a grapple claw or a Maltese-cross transmission.

Figure 2:
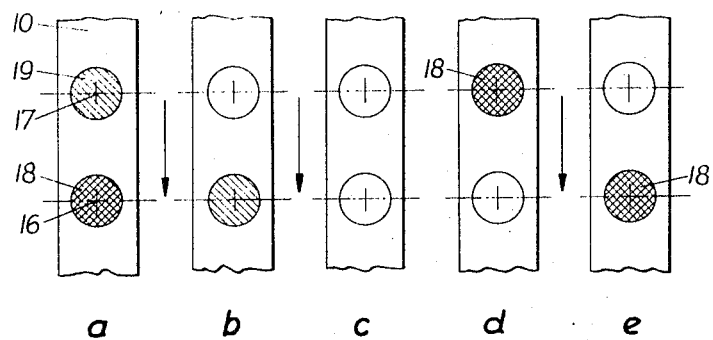

Further details of the invention will appear from the following description of an embodiment of the invention with reference to the accompanying drawing in which FIG. 1 is a schematic view of an embodiment of the invention, and FIG. 2 a schematic illustration of the filter in successive phases of operation of the device shown in FIG. 1.

The device shown in the drawing is a fully automatic instrument wherein the taking of samples of flue gases and the recording and measurement of the soot content of individual flue gas samples are automatic. For the control of all motions and switching operations, a servomotor 1 has been provided, which in a manner known per se (not shown) releases the vanes of a pneumatic servo arrangement by means of sequence switch cams.

The flue gas samples are taken directly from the exhaust manifold 2 of the internal combustion engine by means of a fuel gas sampling device 3 followed by a sampling pipe 4 terminating in the body of a sampling cylinder 5, the piston of which is actuated by means of a pneumatic operating cylinder 6 provided with a four-way valve. The body of the sampling cylinder 5 is designed to receive a predetermined volume of flue gas, say for example, a sampling volume of two pints.

Soot particles and other residues from combustion included in the flue gas in the form of chemical agents in suspension are removed from the flue gas by filtering the flue gas samples in a cylinder 7 inserted in the sampling pipe 4. The cylinder 7 comprises a press-pad 9 actuated by compressed air via a three-way valve 8. The cylinder 7 and the press-pad 9 are provided with parallel sealing surfaces opposite each other between which a filter paper tape 10 reeled off a spool 11 is passed. A pneumatic feeder 12 also actuated via the three-way valve 8 permits the rhythmic advance of the filter paper tape 10 in transverse relation to the direction of the axis of the cylinder 7.

Moreover, the filter paper tape 10 runs through a photoelectric measuring instrument 13 located between the cylinder 7 and the feeder 12, wherein the relative light transmittance of the filter paper tape 10 previously blackened in the cylinder 7 is measured. The recordings are readable on an indicator 15 arranged on the measuring desk of the test bench and connected to the photo-electric measuring instrument 13 via a lead wire 14. It is suggested to provide for the indicator 15 means for automatically adjusting the zero-white-level of the filter paper tape 10 by means of a measuring bridge, amplifier, potentiometer and direct-current motor, in order to facilitate the operation of the instrument to a considerable degree.

With reference to FIG. 2, wherein the various positions of the filter paper tape 10 in relation to the optical axis 16 of the photo-electric measuring instrument 13 and to the axis 17 of the cylinder 7 are illustrated, the operation of the device according to the invention can be described as follows: The position $a$ of the filter paper tape 10 indicates the operational phase after the measurement has been completed. The area 18 which had been blackened during the last flue gas sampling is still located in the optical path of rays of the photo-electric measuring instrument 13. The section of the tape located in the area of the axis 17 of the cylinder 7 has been darkened in the meantime by a coating 19 as a result of gas oscillations in the line of the sampling device. In order to eliminate measuring faults due to overlapping of soot separated during the next fuel gas sampling operation with the already existing coating 19 it is therefore, necessary to provide for a double advance of the filter paper tape 10 prior to the beginning of the next measurement. The corresponding tape positions are designated by reference letters $c$ and $d$. In the position marked $c$ the indicator 15 is adjusted by the determination of the zero-white level of the filter tape 10. At the same time, yet another flue gas sample is taken which leaves a blackened spot 18 on the section of the tape located in the area of the cylinder 7 (position $d$). Upon completion of the sampling operation, the filter paper tape 10 is advanced by yet another switch step so that the blackened spot 18 reaches the area of the optical axis 16 of the measuring instrument 13 (position $e$).

In that position the blackening of the spot 18 is measured by means of the photo-electric measuring instrument 13 and passed on to the indicator 15. Upon completion of the measurement the filtered flue gas is again blown back from the sampling cylinder 5 into the sampling pipe 4 and via the sampling device 3 into the exhaust manifold 2. Thus the sampling pipe 4 and the sampling device 3 cleanse themselves automatically.

In many cases it will be found convenient to convey the values supplied by the photo-electric measuring instrument 13, if necessary in conjunction with other test data of the tested engine, to a printer charting these values in tabulated form. This method of recording test data is particularly useful and revealing for the overall representation of test results.

We claim:
1. A device for determining the soot content of flue gases, comprising a sampling pipe branching off, the pipe carrying the flue gas current, a filter tape crossing the said sampling pipe, a step-by-step switchgear for the rhythmic advance of the filter tape in transverse relation to the said sampling pipe, a photo-electric measuring instrument receiving the said filter tape and measuring the degree of blackening of such places of the filter tape as have previously been traversed by the flue gases branched off the sampling pipe, wherein a guide means for the said filter tape is provided at the intersection of the said filter tape and the said sampling pipe, the said guide means having a stationary sealing surface arranged in transverse relation to the sampling pipe, and a device for holding down the filter tape, the said device having a sealing surface located opposite the first-mentioned sealing surface and in parallel relation to the latter, the said filter tape passing between the two sealing surfaces, and the sealing surface of the said device being applicable against the said stationary sealing surface during interruptions of the filter tape feed.

2. A device as claimed in claim 1, comprising a receiver cylinder, a pneumatically operated displaceable piston in the said cylinder, the said sampling pipe terminating in the said receiver cylinder, the maximum volume of the receiver cylinder in the inner end position of the said piston corresponding to a predetermined amount of the flue gas taken from the flue gas current.

3. A device as claimed in claim 2, wherein a central control member is provided for the control of the motion of the piston of the said receiver-cylinder, the opening and closing motions of the said holding-down device and of the said step-by-step switchgear.

References Cited

UNITED STATES PATENTS 2,675,697  4/1959  Quynn et al. _____ 73—39

FOREIGN PATENTS 1,405,386  5/1965  France.

RICHARD C. QUEISSER, Primary Examiner

JOHN K. LUNSFORD, Assistant Examiner